United States Patent [19]

Pearson et al.

[11] Patent Number: 5,348,992

[45] Date of Patent: Sep. 20, 1994

[54] AEROSOL COMPOSITIONS CONTAINING NON-AQUEOUS DISPERSIONS

[75] Inventors: Paul D. Pearson, Diamond; Madhukar Rao, Brecksville; Richard F. Tomko, North Olmsted, all of Ohio

[73] Assignee: The Sherwin-Williams Company, Cleveland, Ohio

[21] Appl. No.: 11,037

[22] Filed: Jan. 29, 1993

[51] Int. Cl.$^5$ .................... C08F 242/00; C08G 63/50
[52] U.S. Cl. .................... 523/523; 524/903; 528/295.5
[58] Field of Search .................... 523/523; 524/903; 528/295.5

[56] References Cited

U.S. PATENT DOCUMENTS

| | | | |
|---|---|---|---|
| 3,776,873 | 12/1973 | Kremer | 524/903 |
| 4,525,499 | 6/1985 | Hayashi et al. | 524/504 |
| 4,983,716 | 1/1991 | Rao et al. | 523/523 |

FOREIGN PATENT DOCUMENTS

| | | | |
|---|---|---|---|
| 0170159 | 9/1984 | Japan | 524/903 |
| 9170159 | 9/1984 | Japan | 524/903 |

*Primary Examiner*—Paul R. Michl
*Assistant Examiner*—Olga Asinovsky
*Attorney, Agent, or Firm*—Steven W. Tan; Robert E. McDonald; Heidi A. Boehlefeld

[57] ABSTRACT

This invention relates to aerosol paint and coating compositions comprising non-aqueous dispersions.

9 Claims, No Drawings

AEROSOL COMPOSITIONS CONTAINING NON-AQUEOUS DISPERSIONS

BACKGROUND OF THE INVENTION

Pressurized paints, more commonly referred to as aerosol paints, have traditionally been high in volatile organic content (VOC) due to both the resin systems used in the paint and the propellant systems used to expel the resin from the container. Newer VOC regulations throughout the United States of America and the world have forced manufacturers to develop alternative aerosol paint formulations which have lower VOC's. In particular, the Bay Area Air Quality Management District (BAAQMD-California), in 1990 and 1991, adopted stringent regulations regarding the allowable levels of volatile organic content in aerosol paints and coatings. For non-flat (gloss) paint products, the acceptable VOC content, expressed as a percent of volatile organic content by weight of product is 65%.

Some manufacturers, such as Page (U.S. Pat. No. 4,384,661) have attempted to formulate acceptable aerosol coating products using water as an ingredient. The present invention represents a major development in aerosol paint formulation. The present invention uses a non-aqueous dispersion as a principal resin in an aerosol paint formulation. The present invention results in a coating composition which is VOC compliant (using the BAAQMD standards), has good in-can stability and better performance properties than aqueous-based aerosol compositions. The present invention solves one of the problems associated with other attempts to formulate lower VOC aerosol products; namely, paint viscosity so high that the products will not spray in an acceptable fashion.

Non-aqueous dispersions (AND's) are well known in the non-aerosol coatings art and typically consist of dispersions of addition polymers in a relatively non-polar non-aqueous liquid containing a steric stabilizing agent having dual affinity to both the dispersing and the dispersed media. For example, U.S. Pat. No 3,198,759 teaches dispersions of addition polymers in a hydrocarbon medium. The hydrocarbon medium contains one or more aliphatic hydrocarbons containing dissolved therein an alkyd formed by either the direct esterification of a drying oil fatty acid with a dicarboxylic acid and a polyhydric alcohol or the indirect esterification of a drying oil by first alcoholization with a polyhydric alcohol and second esterification with a polybasic acid. European Patent Application 0 310 331 A2 teaches a non-aqueous dispersion of a soluble low molecular weight non-alkyd polymer which is attached or adsorbed onto a second non-soluble alkyd-free polymer. U.S. Pat. No. 4,530,957 teaches non-aqueous dispersions based on crosslinked acrylic polymer particles dispersed in a non-aqueous medium having a polymeric dispersion stabilizer. The polymeric dispersion stabilizer can be an alkyd which is formed by the self condensation of 12-hydroxystearic acid followed by a capping reaction with glycidyl methacrylate. U.S. Pat. No. 4,206,099 teaches non-aqueous dispersions of crosslinked polymer particles in a non-aqueous medium having an amphipathic steric stabilizing agent. The steric stabilizing agent can be a graft copolymer obtained by reacting a low molecular weight carboxyl group terminated condensate of linseed oil fatty acids and 12-hydroxystearic acid with acrylic copolymers. U.S. Pat. No. 3,779,977 teaches non-aqueous dispersions of an acrylonitrile copolymer in a liquid butadiene homopolymer or copolymer in a non-polar organic hydrocarbon liquid.

Previous work by Rao et al. (U.S. Pat. No. 4,983,716 has shown that selecting alkyds which have specific properties for use as the steric stabilizing media for an AND can lead to high solids, low VOC stable NAD's which exhibit acceptable viscosities when used as non-aerosol paints and coatings. In the present invention, we have found a means for producing aerosol paint compositions using NAD's. The particular NAD's which are acceptable for use herein utilize either conventional alkyds or the alkyds taught by Rao et al. as the steric stabilizing media. These NAD's have excellent stability, filterability, gloss, low grit, viscosity and tack-free and dry hard times when formulated as air dry coating compositions. We have now been able to incorporate these NAD's into aerosol compositions to achieve a level of performance not previously associated with lower VOC aerosol paints. The NAD's used in this invention air dry faster than the alkyds used to make the NAD; consequently, they represent an improvement over traditional alkyd-based aerosol paints, as well.

The NAD's used herein utilize either conventional, traditional alkyds or the alkyds taught by Rao et al. as the dispersing media and steric stabilizer. These NAD's require a specific selection process wherein certain critical parameters, described fully below, must be observed in order to produce a NAD with a viscosity sufficiently low so as to be useful in the production of a stable, high performance, low VOC aerosol coating. Selection of the remainder of the aerosol coating, the propellant, and even the valve and actuator components is also important to produce a stable, lower VOC aerosol paint composition with acceptable spraying characteristics.

SUMMARY OF THE INVENTION

This invention relates to aerosol paint and coating compositions containing non-aqueous dispersions (NAD's). The compositions of this invention comprise an NAD comprised of an alkyd as the dispersing medium and steric stabilizer for the polymerization product of specific monomers, which polymers are predominantly non-soluble in the alkyd medium. The NAD's used herein are the product of a process which utilizes an alkyd steric stabilizer in the dispersing media, a combination of monomers wherein at least one monomer is selected from the group consisting of acrylonitrile, methacrylonitrile, hydroxy ethyl acrylate and methacrylate, methyl acrylate and methacrylate, acrylamide, methacrylamide, vinyl chloride, vinylidene chloride, acrylic acid, methacrylic acid, itaconic acid, maleic acid, fumaric acid, the methyl esters of itaconic, maleic and fumaric acid, and mixtures thereof, wherein at least one monomer is a hydroxy-functional free radical addition monomer, and wherein the polymerization is conducted in the presence of a chain transfer agent. This yields NAD's which are particularly suited for further incorporation into aerosol compositions as taught herein. The aerosols taught herein are particularly useful in interior and exterior applications in the architectural, industrial maintenance, hardware, general purpose aerosols, and automotive touch-up paint and coatings industries.

The process for producing the NAD's used herein comprises using an alkyd meeting the criteria established herein as the dispersing medium, either alone or in combination with some minor amount of hydrocarbon, aromatic, polar, ketone, ester, or alcohol solvent, or in combination with other minor amounts of other alkyd, modified-alkyd, or hydrocarbon dispersing media, for the polymerization of monomers, which polymers are predominantly insoluble in the alkyd medium. The particular means for the production of the alkyd are not of import to this invention. Thus, the alkyd can be produced according to any of the traditional processes for the production of alkyds which are readily available from the art, including those taught by Rao et al. However, typically the alkyd stabilizer has an Mz of greater than about 150,000, and a viscosity at 25 degrees C. of no greater than about 10,000 cps.

The alkyd serves as the dispersing medium and steric stabilizer for the reaction of free radical addition monomers which produce a polymer which is predominantly insoluble in the alkyd medium. The monomers are polymerized in the presence of the alkyd to produce the non-aqueous dispersions used in this invention. A critical parameter which must be followed is that at least one monomer must be selected from the group consisting of acrylonitrile, methacrylonitrile, hydroxy ethyl acrylate and methacrylate, methyl acrylate and methacrylate, acrylamide, methacrylamide, vinyl chloride, vinylidene chloride, acrylic acid, methacrylic acid, itaconic acid, maleic acid, fumaric acid, the methyl esters of itaconic, maleic and fumaric acid, and mixtures thereof. A second critical parameter is that at least one monomer must have hydroxy-functionality. A third critical parameter which must be followed is that the polymerization must take place in the presence of a chain transfer agent.

We have found that by following these key critical parameters, explained in more detail below, one can formulate an NAD which is stable, non-gritty, filterable, with a substantially equal or lower viscosity at the same solids level than the alkyd which was used to make the NAD and which dries faster than that alkyd. We have found that failure to follow these key critical parameters results in NAD's which do not exhibit the equivalence or improvements in viscosity or dry time vis-a-vis the alkyd used to make them and/or are unstable, gritty, non-filterable or have excessively low conversions. We have further found that these NAD's, because of their low viscosity, are particularly well suited for use in lower VOC aerosols.

Accordingly, it is an object of this invention to teach aerosol paints and coatings containing non-aqueous dispersions.

It is another object of this invention to teach a low VOC aerosol containing a non-aqueous dispersion having improved air dry times.

DETAILED DESCRIPTION OF THE INVENTION

As stated above, the process for producing the NAD's used herein comprises selecting an alkyd; and using this alkyd as the dispersing medium, either alone or in combination with some minor amount of solvent or other dispersing media, for the polymerization of monomers, which polymers are predominantly insoluble in the alkyd medium. The alkyd used in these NAD's is formed by any of the traditional processes such as fatty acid esterification, alcoholysis of a drying oil with later reaction with a di- or tri-basic acid, or the process taught by U.S. Pat. No. 4,983,716 incorporated herein by reference. The alkyds of this invention are preferably selected from conventional alkyds for the paint and coatings industry. Conventional alkyds include alkyds having a z-average molecular weight greater than about 150,000, typically between about 250,000 and about 1,000,000.

Typical raw materials for the formation of alkyds include triglyceride oils or the fatty acids thereof. These can be selected from the group consisting of linseed oil, soya oil, coconut oil, cottonseed oil, peanut oil, canola oil, corn oil, safflower oil, sunflower oil, dehydrated castor oil, fish oil, perilla, lard, walnut oil, tung oil, tall oil, the fatty acids thereof and mixtures thereof. Particularly preferred are those oils and acids containing unsaturation in the glyceride chains. Particularly preferred are soya oil, dehydrated castor oil and linseed oil and the fatty acids thereof.

Multi-functional alcohols, and mixtures thereof, are also common raw materials for the production of alkyds. One suitable hexafunctional alcohol includes dipentaerythritol. One suitable tetrafunctional alcohol includes pentaerythritol. Suitable trifunctional alcohols include the group consisting of trimethylol propane, trimethylol ethane, glycerine, tris hydroxyethyl isocyanurate, and mixtures thereof, either alone or in combination with a difunctional alcohol selected from the group consisting of ethylene glycol, propylene glycol, cyclohexane dimethanol, and mixtures thereof. Additionally, dimethylol propionic acid can be used in combination with the trifunctional alcohol. Multi-functional alcohols, trifunctional alcohols, and mixtures thereof are particularly preferred due to the degree of branching they allow. Difunctional alcohols, if used, are preferably used as a minor component in combination with trifunctional alcohols. A portion of monofunctional alcohol, or monobasic acid such as soya fatty acid, linseed oil fatty acid, benzoic acid or crotonic acid, up to about 20% by weight of the total alkyd can be added with the multifunctional alcohol to control molecular weight and act as a chain stopper.

Another typical raw material used in the formation of alkyds is multi-functional carboxylic acids or anhydrides. Suitable trifunctional carboxylic acids include trimelletic acid, trimesic acid, 1,3,5-pentane tricarboxylic acid, citric acid and others whereas suitable trifunctional anhydrides include trimelletic anhydride, pyromelletic anhydride and others. Difunctional carboxylic acids include phthalic acid, isophthalic acid, terephthalic acid, maleic acid and fumaric acid and mixtures thereof. Mixtures of such acids and anhydrides are also acceptable.

The amounts of oil, acid and alcohol used should be such that the resulting alkyd preferably has a high degree of branching, a z-average molecular weight, $M_z$, greater than about 150,000, preferably between about 250,000 and about 1,000,000. It should be appreciated that the longer these materials are allowed to react, the greater the resultant molecular weight of the alkyd. The alkyd should preferably have an oil length of between about 50% and 75%, an acid value less than about 20, and a hydroxyl number less than 100, preferably between about 40 and about 80.

If desired, a reaction catalyst such as lithium hydroxide monohydrate, barium hydroxide, or di-butyl tin oxide can be added in an amount of approximately 0.02% by weight of oil.

The NAD's used herein typically have Brookfield LVT #3 (6/12 rpm) viscosities less than about 10,000 cps at 25 degrees C., preferably less than about 7,000 cps. They can easily be formulated into aerosol paint formulations with volatile organic contents less than 65% (using the Bay Area Air Quality Management District's guidelines) and exhibit excellent air dry times using conventional drier compounds. Interestingly, the NAD's of this invention, at the same solids level, exhibit viscosities substantially equal to or lower than the alkyds used to prepare them. Thus, they have the unique ability to be formulated into lower VOC aerosols in combination with the alkyds from which they were produced. They also have very fast dry times when compared to the alkyds used to prepare them.

As stated above, conventional alkyds meeting the criteria described herein can be used in this invention. Particularly suitable commercially available alkyds for use in this invention include the alkyds available from Cargill, Inc. such as 5070 (soya oil alkyd), 5054 (linseed oil alkyd), 5091 (tall oil fatty acid alkyd), 5076 (soya oil in odorless mineral spirits alkyd), and 5074 (isophthalic soya oil alkyd). One particularly preferred alkyd is the reaction product of soya oil, pentaerythritol, maleic anhydride and phthalic anhydride as shown in Example I, below.

When preparing non-aqueous dispersions for use in this invention, the monomers should be selected from monomers which would produce a polymer via the free radical addition reaction mechanism, which polymer is predominantly insoluble in the alkyd medium. It is essential that at least one of the monomers be selected from the group consisting of acrylonitrile, methacrylonitrile, hydroxy ethyl acrylate and methacrylate, methyl acrylate and methacrylate, acrylamide, methacrylamide, vinyl chloride, vinylidene chloride, acrylic acid, methacrylic acid, itaconic acid, maleic acid, fumaric acid, the methyl esters of itaconic, maleic and fumaric acid, and mixtures thereof. It is also essential that at least one of the monomers have hydroxy functionality. More preferably, between about 5% and 35% by weight of the total reactor solids comprises hydroxy functional monomers. Most preferably, between about 10% and about 25% by weight of the total reactor solids comprises a hydroxy functional monomer such as hydroxy ethyl acrylate or hydroxy ethyl methacrylate.

In addition to pure monomers, preformed polymers, polymeric intermediates, multifunctional epoxides, melamines and isocyanates, can be included in the reactor charge.

Most preferred is a combination of methyl methacrylate and hydroxy ethyl acrylate wherein the methyl methacrylate is present in an amount of between about 20 and 40%, and the hydroxy ethyl acrylate is present in an amount of between about 10 and 25%, by weight of total reactor solids.

Additional monomers selected from the group consisting of hydroxy propyl acrylate and methacrylate, ethyl acrylate and methacrylate, butyl acrylate and methacrylate, lauryl acrylate and methacrylate, and the like, trimethylol propane triacrylate and trimethacrylate, hexanediol diacrylate, Tone M-100 (caprolactone modified hydroxy ethyl acrylate), polyethylene oxide acrylate and methacrylate, polypropylene oxide acrylate and methacrylate, allyl alcohol, can be included in the reactor charge in relatively minor amounts, so long as they are not added in percentages sufficient to adversely affect the viscosity and/or odor of the NAD. Certain monomers are to be avoided such as styrene because of an unacceptable resultant increase in NAD viscosity. Also to be avoided are divinyl benzene, vinyl naphthalene, and vinyl toluene because these are generally soluble in alkyds. Vinyl acetate is unacceptable for inclusion as it does not polymerize under the conditions taught herein. These monomers have been found to contribute to a decrease in yield, additional grit, and/or a lessening of stability over time.

To prepare the NAD's used herein, the alkyd dispersing medium is used as the polymerization medium for the monomer charge. The alkyd medium can be diluted with mineral spirits or other solvent if desired, with the primary limitation being concern for the VOC of the composition and the viscosity increase which accompanies the swelling and solubilization of the dispersed phase in stronger solvents.

The total amount of alkyd contained in the reaction vessel, including any alkyd which may be added with the monomer charge, should comprise between about 35% to about 75%, preferably from about 40% to about 60%, by weight of the total reactor solids. The free radical addition monomer charge should, after completely added to the reaction vessel, account for approximately 65% to about 25%, preferably between about 60% to about 40%, by weight of the total reactor solids.

A mercaptan-containing chain transfer agent such as methyl mercaptopropionate, dodecyl mercaptan, thioglycolic acid, or 2-mercapto ethanol must also be added to the vessel in an amount from about 0.1% to about 6.0% by weight of total reactor solids. Most preferred is 2-mercapto ethanol.

An initiator which will not oxidize the chain transfer agent is selected from the group consisting of organic peroxides such as benzoyl peroxide, lauroyl peroxide, di-t-butyl peroxide, acetyl peroxide, t-butyl peroctoate, t-amyl peroctoate, and t-butyl perbenzoate, or selected from the group consisting of nitrile initiators such as a,a'-azobisisobutyronitrile, and mixtures thereof and is also added in an amount up to about 3% by weight of the total monomer charge.

All free radical addition reactants are preferably added via dropwise addition over a period of time to the alkyd dispersing medium. The monomer charge can be added pure, or, in a preferred embodiment, the monomers can be dispersed in an amount of the alkyd prior to addition to the dispersing medium. The amount of alkyd used for such a dispersion should be included in the calculation of the overall amount of alkyd present in the reaction vessel. Any additional ingredients such as acrylic polymers and copolymers, macromonomers, silicones, XI-100 TM from Monsanto (poly allyl glycidyl ether), alkyds, uralkyds, urethane-modified oils, polyesters, and epoxy esters can be included in the reactor charge provided they are solubilized in either the monomer charge or the alkyd dispersing media.

The temperature of the contents of the reaction vessel should be maintained between about 200° F. and 250° F. for the entire period that monomer charge is being added. A nitrogen blanket is also highly preferred. Upon completion of the monomer addition, up to about 0.1% by weight of total reactor charge an activator selected from the group consisting of the iron, copper, vanadium, cobalt and manganese naphthenates, octoates, hexanates and isodecanoates is added to the reactor vessel and from about 0.5% to about 5.0% by weight of total reactor solids of a hydroperoxide Chaser composition selected from the group consisting of cumene hydroperoxide, t-butyl hydroperoxide, t-amyl hydroperoxide, and the like is added dropwise over a period of about 90 minutes. The hydroperoxide chasers are preferred because they oxidize the remaining mercaptan from the chain transfer agent and thus eliminate the odor from the sulfur. Upon completion of the chase, the temperature should be maintained between 200° F. and 250° F. for approximately one hour. At the end of that hour, the heat is removed and the contents of the vessel are filtered.

These non-aqueous dispersions are now ready for use as the resin in the aerosol coatings of this invention. Alternatively, they can be blended or used in combination with other alkyds or NAD's and then formulated into an aerosol coating composition.

Paint compositions which are suitable for being pressurized as aerosol paints include, in the bulk paint formula, at a minimum, the NAD resin, preferably in an amount of between about 40% by weight and 100% by weight (based upon total resin content); and an amount of a propellant sufficient to propel the resin from the container. However, from a practical standpoint, in order to formulate a shelf stable, commercially viable, aerosol paint product, several other ingredients should preferably also be present in the compositions. These ingredients include solvents, dispersants, surfactants, rheology modifiers, thixotropes, extenders, colors and pigments, anti-skinning agents, drying agents, fungicides, mildewcides, preservatives, UV absorbers, anti-marring agents, anti-cratering agents, flow and leveling agents, fragrances, defoaming agents, flattening agents, corrosion inhibitors and anti-rusting agents.

To make a VOC compliant aerosol product (as defined by the current Bay Area Air Quality Management District standard of minimum 35% solids based on total pressurized can contents weight), the NAD should represent from between about 10% to about 85% by weight of the can solids content (that is, between about 3.5% and about 30% by weight of the total pressurized can contents). Preferably, the weight percentage of total resin in the can is between about 10% and 30%, of which, between about 40% and 100% is NAD. The remainder of the can contents comprises other ingredients discussed above and propellants.

Suitable rheology modifiers are well known in the aerosol art and can comprise organoclays, fumed silica, dehydrated castor oil organic derivatives (exemplary trade names: Suspeno ® 201X available from Polyresins, Inc.-USA; Thixatrol ® available from NL Industries; Bentone (R), Flowtone (R), English China Clay), polyamides, polyamide modified alkyds, MPSA-60, Rheox, alkylbenzene sulphonate derivatives, aluminum, calcium and zinc stearates, calcium soyate, and the like.

Suitable extenders are also well known in the art and can comprise amorphous, diatomaceous, fumed, quartz and crystalline silica, clays, aluminum silicates, magnesium aluminum silicates. talc, mica, delaminated clays, calcium carbonates and silicates, gypsum, barium sulfate, zinc, calcium zinc molybdates, zinc oxide, phosphosilicates and borosilicates of calcium, barium and strontium, barium metaborate monohydrate, and the like.

Suitable colors and pigments are well known in the art and can comprise for example, titanium dioxide, carbon black, graphite, ceramic black, antimony sulfide, black iron oxide, aluminum pastes, yellow iron oxide, red iron oxide, iron blue, phthalo blue and green, nickel titanate, dianisidine orange, dinitroaniline orange, imidazole orange, quinacridone red, violet and magenta, toluidine red, molybdate orange, and the like.

Suitable solvents can comprise propylene and ethylene glycol ethers and acetates, alcohols, ketones, aliphatic and aromatic hydrocarbons and naphthas, petroleum and wood distillates, turpentine, pine oil, and the like. Solvent selection is limited primarily by the desire to maintain the overall VOC level of the coating composition as low as possible without resulting in an unacceptable increase in viscosity. Preferred solvents include a blend of aliphatic hydrocarbons available from Ashland Chemical under the trade name Lacolene ™ 33.

Anti-skinning agents such as methyl ethyl ketoxime, o-cresol, and hydroquinone can be included.

Drying agents can comprise standard metallic and rare earth driers such as cobalt, calcium, potassium, barium, zinc, manganese, tin, aluminum, zirconium and vanadium napthenates, octoates, hexanates, and isodecanoates. A particularly preferred drier composition is a combination of cobalt, calcium and zirconium driers present in an amount from about 0.1% to about 5.0% by weight of the coating composition.

Suitable dispersants and surfactants can comprise any of the readily available dispersants and surfactants to the coatings industry, including the anionic and nonionic surfactants, soya lecithin, alkyl ammonium salts of fatty acids, amine salts of alkyl aryl sulfonates, unsaturated organic acids, sulfonated castor oil, mixtures of high boiling point aromatic and ester solvents, sodium salts of aryl sulfonic acid, Solsperse ™ from ICI, Nuosperse ® 657 from Huls America, Inc. and the like.

The process for filling the composition into the aerosol container is well-known in the aerosol filling art. It is not critical to the success of the present invention. However, in general, the resin component is added to the remainder of the paint ingredients and is then added to an open aerosol container. Two standard methods of adding the propellant are used in the industry. In the first method, the container is sealed with a valve cup and valve assembly mechanism and the propellant is injected into the can through the valve. In the second method, the valve cup is not sealed until the propellant is charged to the container under the valve cup rim.

The selection of the valve, the dip tube and the actuator can be of importance to the production of a lower VOC aerosol composition assuming one is concerned with the spraying characteristics of the composition. One should appreciate that various combinations can achieve similar results. However, the following guidelines have been developed in order to successfully prepare a low VOC aerosol which has acceptable spraying characteristics.

In the present invention, we have found that in order to produce a low VOC aerosol paint product which sprays acceptably (that is, it does not clog the valve or actuator, it atomizes properly, and it does not trap unacceptable levels of solvent or air in the sprayed film) it is important to select the valve, actuator and dip tube combination carefully. In the present invention, the preferred valving mechanism is a valve which contains a vapor tap. A vapor tap is a small hole placed at the base of the valve, inside the pressurized container, which operates so as to draw vapor into the valve as the paint is drawn through the dip tube. Typical circular cross section vapor taps range in diameter from about 0.008 inch to about 0.030 inch. For lower VOC coatings according to this invention, it is preferred that the vapor tap be relatively small in size, preferably in the 0.008 inch diameter range. However, if one selects a dip tube having a smaller diameter, for example a capillary dip tube having a diameter less than or equal to about 0.070 inch, the size of the vapor tap can be increased up to about 0.013 inch. We prefer to use a 0.008 inch vapor tap with a standard dip tube having a diameter of about 0.147 inch. A preferred valve is available from Seaquist Valve Company, Cary, Ill. under the trade designation of AR-74.

The selection of the actuator is likewise important. Actuators are the tip which is inserted into the top of the valve and which thus release the paint from the can when pressed. Two types of actuators exist: "mechanical break-up" and "non-mechanical break-up" actuators. Mechanical break-up actuators have physical structures designed to impede the flow of the sprayed material as it exits the actuator in order to mechanically break-up the particles. Non-mechanical break-up actuators do not have such a structure. We prefer to use a non-mechanical break-up actuator because the likelihood of clogging the actuator is lessened.

In general, however, all actuators have both a "groove" which is where the paint enters the actuator from the valve and an "orifice" which is where the paint physically leaves the actuator. Relative to other actuators, we prefer the use of a smaller groove size, generally below about 0.017 inches, preferably about 0.013 inches. Larger groove sizes tend to eject the paint from the container too forcefully causing poor atomization and entrapment of too much solvent and air in the film.

The preferred orifice size is less than about 0.025 inch, preferably about 0.018 inch. A preferred actuator is available from Seaquist Valve Company under the trade designation RAR 135.

The amount of propellant used should be sufficient to enable the user to dispense the contents of the container upon operation of the valve. Generally, the amount of propellant used is between about 10% and about 40% by weight of the contents of the container. In the present invention, an amount of propellant of between about 15% and about 25% is preferred. This generally yields an initial pressure in the container of between about 40 pounds per square inch and about 70 pounds per square inch.

From a chemical standpoint, suitable propellants include the aliphatic hydrocarbons having from 1 to 4 carbons, such as propane, isobutane, butane and isomers thereof. Also suitable from a chemical standpoint are the chlorofluorocarbons such as CFC 11, 12 and 22. Likewise, dimethyl ether is chemically suitable for use herein. Due to legal constraints in the USA, preferred propellants include propane, isobutane, butane and mixtures thereof.

The following examples will demonstrate various embodiments of this invention.

EXAMPLE I: PREPARATION OF ALKYD

Charge a reactor equipped with inert gas, mechanical stirrer, and condenser with 6409.10 lbs alkali refined soybean oil, 1432.70 lbs of pentaerythritol and 4.37 lbs of lithium hydroxide catalyst and heat to 495 degrees F. Hold for approximately two hours until clear. Cool to 360 degrees F. and add 669.24 lbs of ethylene glycol. Cool to 330 degrees F. Add 4159.90 lbs of molten phthalic anhydride and heat to 370 degrees F. and hold for one hour. Add 570.96 lbs of xylene, heat to 495 degrees F. and hold for a viscosity of Y-Z1 using the Gardner-Holdt method at 49–51% non-volatile volatile materials (NVM) and an acid value of between about 4 and 12. Thin down with sufficient mineral spirits to produce a 49–51% NVM alkyd.

EXAMPLE II: PREPARATION OF ALKYD

Charge a reactor equipped with inert gas, mechanical stirrer, and condenser with 7612.63 lbs alkali refined soybean oil, 1679.39 lbs of pentaerythritol and 3.52 lbs of lithium hydroxide catalyst and heat to 495 degrees F. Hold for approximately two hours until clear. Cool to 360 degrees F. and add 55.89 lbs of maleic anhydride (briquette form). Add 2896.34 lbs of molten phthalic anhydride and heat to 370 degrees F. and hold for one-half hour. Add 494.52 lbs of xylene, heat to 495 degrees F. and hold for a viscosity of Z-Z2 using the Gardner-Holdt method at 69–71% NVM and an acid value of between about 6 and 10. Thin down with sufficient mineral spirits to produce a 70% non-volatile materials (NVM) alkyd.

EXAMPLE III: PREPARATION OF NAD FROM THE ALKYD OF EXAMPLE II

The following procedure was used to make an NAD from the alkyd of Example II:

Charge 1671.55 lbs of the alkyd of Example II and 879.69 lbs of mineral spirits to a reactor equipped with a mechanical stirrer. Use an inert gas blanket. Heat the contents to about 230 degrees F. In a separate weighing tank, charge 1908.36 lbs of the alkyd of Example II. Add 2228.73 lbs of methyl methacrylate, 835.77 lbs of hydroxyethyl acrylate, 117.77 lbs of mineral spirits and 17.19 lbs of 2-mercaptoethanol. Make an initiator solution comprising 6.13 lbs t-butyl peroctoate and 45.58 lbs of mineral spirits. Begin a three hour dropwise addition of the monomers from the weighing tank and a three hour twenty-five minute dropwise addition of the initiator solution to the reactor. Upon completion of the addition of the solutions, rinse the weighing tank with 3.92 lbs of mineral spirits and add this to the reactor. Cool the contents to 212 degrees F. and hold for approximately one hour. Add 0.24 pounds of vanadium naphthenate. Chase with mineral spirits and cumene hydroperoxide Hold the temperature at 100° C. for approximately ½ to 1 hour after the chase has been completely added. Shut off heat and filter the contents of the reactor through a 10 micron polyester filter bag.

A bulk, black paint composition suitable for use in an aerosol paint product was made using the alkyd of Example I and the NAD of Example III as follows:

EXAMPLE IV: BULK PAINT CONTAINING ALKYD OF EXAMPLE I AND NAD OF EXAMPLE III

Charge 2.89 pounds of Lacolene®33 aliphatic hydrocarbon blend to a mixing vessel. Charge 200.00 pounds of the alkyd of Example I. Charge 12.00 pounds of Nuosperse® 657 dispersant. Charge 30.00 pounds Raven 14 black pigment. Charge 10.00 pounds 4% calcium naphthenate. Charge 300.00 pounds of Barytes #106 barium sulfate extender. Charge 12.00 pounds Suspeno® 201X rheology modifier. Mill until a Hegman grind value of between about 6 to 7. Raise the temperature to about 110 degrees F. and hold for approximately 10 minutes. Begin letdown with 30.00 pounds Butrol® 9101 corrosion inhibiting pigment, 380.40 pounds of the alkyd from Example I, 414.00 pounds of the NAD of Example III, 50.00 pounds of 4% calcium naphthenate, 6.00 pounds of 6% cobalt naphthenate, 16.00 pounds of zirconium ethylhexanoate and 2.00 pounds of methyl ethyl ketoxime.

EXAMPLE V: AEROSOL FORMULATION USING THE PAINT OF EXAMPLE IV

Charge approximately 83.5 parts by weight of the bulk paint of Example IV to a standard aerosol container. Add a AR-74 valve (Seaquist) with 0.008 inch vapor tap and 0.147 inch diameter dip tube. Seal to the container. Charge 16.5 parts by weight of propane propellant to the container through the valve. Add a RAR-135 actuator (Seaquist).

What is claimed is:

1. A composition suitable for being dispensed from a pressurized aerosol container comprising a non-aqueous dispersion of addition polymers in an alkyd medium and a propellant.

2. The composition of claim 1 wherein said non-aqueous dispersion is the reaction product of two or more monomers polymerized in the presence of said alkyd via the free radical addition mechanism.

3. The composition of claim 2 wherein at least one of said monomers is selected from the group consisting of acrylonitrile, methacrylonitrile, hydroxy ethyl acrylate and methacrylate, methyl acrylate and methacrylate, acrylamide, methacrylamide, vinyl chloride, vinylidene chloride, acrylic acid, methacrylic acid, itaconic acid, maleic acid, fumaric acid, the methyl esters of itaconic, maleic and fumaric acid, and mixtures thereof; wherein at least one of said monomers has hydroxy-functionality; and wherein said polymerization is conducted in the presence of a chain transfer agent.

4. The composition of claim 3 wherein between about 5% and 35% by weight of the reactor solids comprises at least one monomer having hydroxy functionality.

5. The composition of claim 4 wherein said hydroxy functional monomer is selected from the group consisting of hydroxy ethyl acrylate and hydroxy ethyl methacrylate, and mixtures thereof.

6. The composition of claim 5 wherein said monomer charge comprises methyl methacrylate and hydroxy ethyl acrylate.

7. The composition of claim 6 wherein said chain transfer agent is selected from the group consisting of methyl mercaptopropionate, dodecyl mercaptan and 2-mercapto ethanol.

8. The composition of claim 1 wherein the propellant is selected from the group consisting of aliphatic hydrocarbons having from 1 to 4 carbons, chlorofluorocarbons, dimethyl ether, and mixtures thereof.

9. The composition of claim 8 wherein the propellant is selected from the group consisting of propane, butane, isobutane and mixtures thereof.

* * * * *